(12) United States Patent
Kusama

(10) Patent No.: US 8,415,575 B2
(45) Date of Patent: Apr. 9, 2013

(54) VEHICLE SWITCH UNIT

(75) Inventor: Hiroshi Kusama, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 259 days.

(21) Appl. No.: 12/887,951

(22) Filed: Sep. 22, 2010

(65) Prior Publication Data

US 2011/0067981 A1    Mar. 24, 2011

(30) Foreign Application Priority Data

Sep. 24, 2009   (JP) ................ P2009-218985

(51) Int. Cl.
*H01H 9/00*    (2006.01)
*H01H 27/06*   (2006.01)

(52) U.S. Cl. .................................. 200/61.54

(58) Field of Classification Search ............ 200/61.54
See application file for complete search history.

(56) References Cited

U.S. PATENT DOCUMENTS

| | | | | |
|---|---|---|---|---|
| 4,129,757 | A * | 12/1978 | Cryer | 200/4 |
| 6,548,773 | B2 * | 4/2003 | Matsumoto et al. | 200/61.54 |
| 6,601,443 | B1 | 8/2003 | Stumpe et al. | |

FOREIGN PATENT DOCUMENTS

| | | |
|---|---|---|
| CN | 1355115 | 6/2002 |
| EP | 0 763 447 A2 | 3/1997 |
| EP | 0 826 948 A2 | 3/1998 |
| JP | 5-254446 | 10/1993 |
| JP | 2000-118295 | 4/2000 |
| JP | 2006-327362 | 12/2006 |

OTHER PUBLICATIONS

Office Action dated Jul. 23, 2012 for the corresponding Chinese patent application 201010272026.3.

* cited by examiner

*Primary Examiner* — Renee Luebke
*Assistant Examiner* — Lheiren Mae Caroc
(74) *Attorney, Agent, or Firm* — Morgan, Lewis & Bockius LLP

(57) ABSTRACT

A vehicle switch unit includes a steering roll connector adapted to be mounted on a steering wheel for outputting a signal from the steering wheel to an exterior portion, a lever combination switch which is provided to a lower side of the steering roll connector for outputting a signal indicating an operation performed on a lever through a connector that is provided on a lower side of the lever combination switch, a steering angle sensor which is provided to a lower side of the lever combination switch and has a connector for outputting a signal indicating a rotating angle of the steering wheel, and a resin sleeve which is mounted on the steering roll connector for transmitting a rotation of the steering roll connector to the steering angle sensor.

3 Claims, 5 Drawing Sheets

VEHICLE SWITCH UNIT

BACKGROUND

The present invention relates to a vehicle switch unit which includes a steering angle sensor for detecting a rotational position of a steering wheel.

In recent years, the posture of a vehicle is controlled according to a rotational position of a steering wheel. As a device for achieving this control, there has been proposed a vehicle switch unit in which a steering angle sensor for detecting a rotational position of a steering wheel is provided on a lever combination switch.

FIG. 9 is a sectional view showing schematically a related lever combination switch unit. The related lever combination switch unit includes a steering roll connector 102, a steering angle sensor 103 and a lever combination switch 104 which are connected together. A steering wheel (not shown) is fittingly mounted in the steering roll connector 102 while the steering wheel is fastened on to a threaded portion 101a of a steering shaft 101 by a nut, whereby a rotation of the steering wheel is transmitted to the steering angle sensor 103 which is connected to a lower side of the steering roll connector 102. Further, the lever combination switch 104 is connected to a lower side of the steering angle sensor 103 so as to return a turn-indicator lever, for example, to its original position when the steering wheel is returned to its neutral position (refer to JP-A-2006-327362). A connector 105 to be connected to an electronic device provided at the steering wheel side is mounted on an upper face of the steering roll connector 102. Also, a neutral position fixing pin 106 for holding a rotor which constitutes the steering roll connector 102 in a rotating neutral position relative to a stator is mounted on the upper face of the steering roll connector 102. The neutral position fixing pin 106 may be removed after the steering wheel is attached.

A connector 7 of the lever combination switch 104 is provided on a lower side of the lever combination switch 104. In this configuration, the steering angle sensor 103 is positioned on an upper side of the lever combination switch 104. Therefore, a connector 108 of the steering angle sensor 103 and the connector 107 of the lever combination switch 104 are positioned on the upper and lower side of the lever combination switch 104 thereacross. Thus, wiring work to the connectors 107, 108 is deteriorated badly. Then, to cope with this drawback, a connecting device 109, which is mainly made up of an extension circuit board, is connected to the connector 108 of the steering angle sensor 103, so that a connector 110 which is provided at an end portion of the connecting device 109 is positioned near the connector 107 of the lever combination switch 104. By this configuration, the connection between the two connectors 107, 108 is facilitated so as to make the wiring work more efficient.

However, the cost involved in the use of the connecting device 109 which is made mainly up of the extension circuit board is relatively high. Therefore, the use of the connecting device 109 causes an increase in the cost of the lever combination switch unit.

SUMMARY

The invention has been made in view of the situations described above, and an object thereof is to provide a vehicle switch unit which can realize a reduction in costs while realizing the facilitation of dose location of connectors.

In order to achieve the above object, according to the present invention, there is provided a vehicle switch unit comprising:

a steering roll connector adapted to be mounted on a steering wheel for outputting a signal from the steering wheel to an exterior portion;

a lever combination switch which is provided to a lower side of the steering roll connector for outputting a signal indicating an operation performed on a lever through a connector that is provided on a lower side of the lever combination switch;

a steering angle sensor which is provided to a lower side of the lever combination switch and has a connector for outputting a signal indicating a rotating angle of the steering wheel; and a resin sleeve which is mounted on the steering roll connector for transmitting a rotation of the steering roll connector to the steering angle sensor.

Preferably, the sleeve has engagement portions to engage with the steering roll connector and the steering angle sensor.

Preferably, the connector of the lever combination switch and the connector of the steering angle sensor are arranged at a same plane perpendicular to an axial direction of the steering wheel.

According to the above configuration, since the steering angle sensor is positioned at the lower side of the lever combination switch, the connector of the lever combination switch provided on the lower side thereof and the connector of the steering angle sensor can be positioned near to each other. Thus, the close location of the connector of the lever combination switch and the connector of the steering angle sensor can be realized, and wiring work to the connectors can be facilitated.

In addition, even though the steering roll connector and the steering angle sensor are positioned at the upper and lower side of the lever combination switch respectively, the rotation of the steering roll connector is transmitted to the steering angle sensor through the sleeve. Thus, the rotation of the steering wheel can be transmitted to the steering angle sensor in an ensured fashion. The resin sleeve can be realized in low cost, thereby making it possible to realize a reduction in the total cost of the vehicle switch unit.

Preferably, the sleeve includes a first sleeve and a second sleeve which are connected to each other by a joint portion, and the joint portion is configured to connect the first sleeve to the second sleeve so that there is no gap between the first sleeve and the second sleeve in a rotating direction of the steering wheel and there is a gap between the first sleeve and the second sleeve in a direction perpendicular to an axial direction of the steering wheel.

According to the above configuration, the gap exists between the first sleeve and the second sleeve at the joint portion in the direction perpendicular to the steering shaft. Thus, even though the steering roll connector is eccentric with the steering angle sensor, the eccentricity can be absorbed so as to transmit the rotation of the steering wheel to the steering angle sensor in an ensured fashion.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Hereinafter, an embodiment of the invention will be described by reference to FIGS. 1 to 8.

Figure 1:
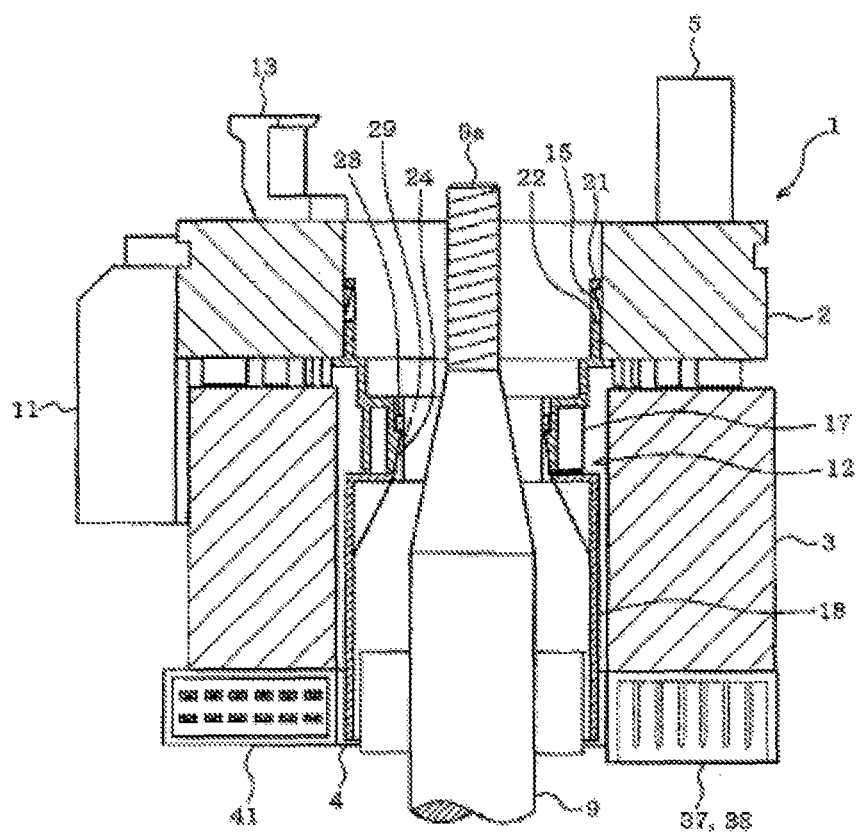
FIG. 1 is a sectional view showing schematically a lever combination switch unit according to an embodiment of the invention.
Figure 2:
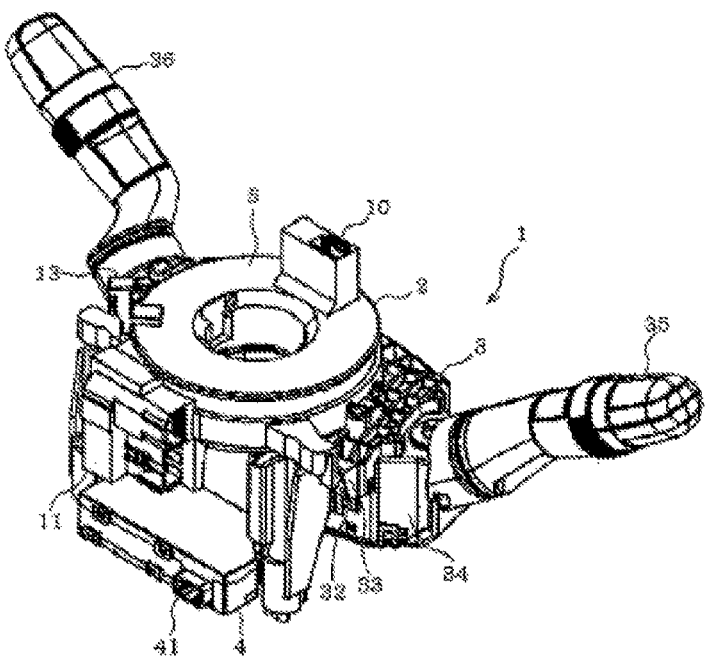
FIG. 2 is a perspective view, as seen obliquely downwards from thereabove, showing the lever combination switch unit.
Figure 3:
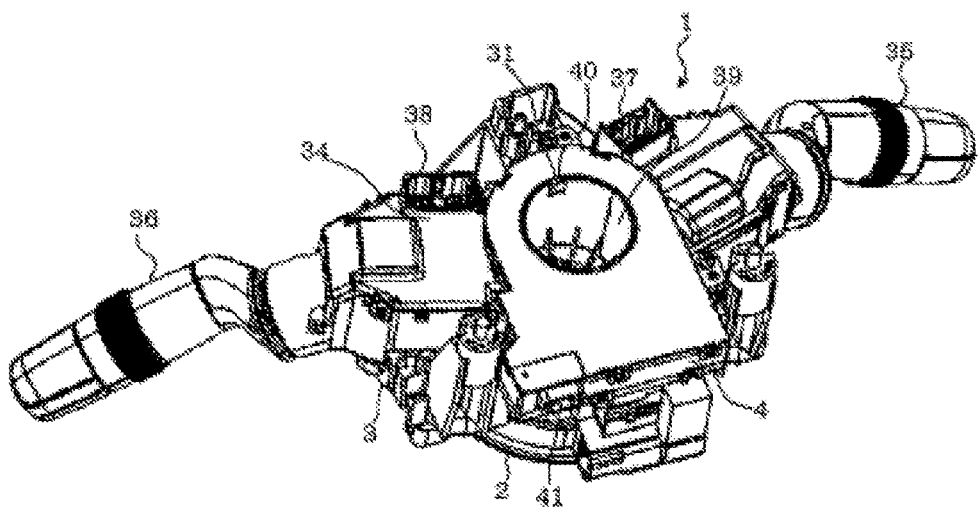
FIG. 3 is a perspective view, as seen obliquely upwards from therebelow, showing the lever combination switch unit.

FIG. 2 is a perspective view, as seen obliquely downwards from thereabove, showing a lever combination switch unit, and FIG. 3 is a perspective view, as seen obliquely upwards from therebelow, showing the lever combination switch unit. A lever combination switch unit 1 (a vehicle switch unit) includes a steering roll connector 2, a lever combination switch 3 and a steering angle sensor 4 which are connected together. The respective constituent components will be described sequentially.

Figure 4:
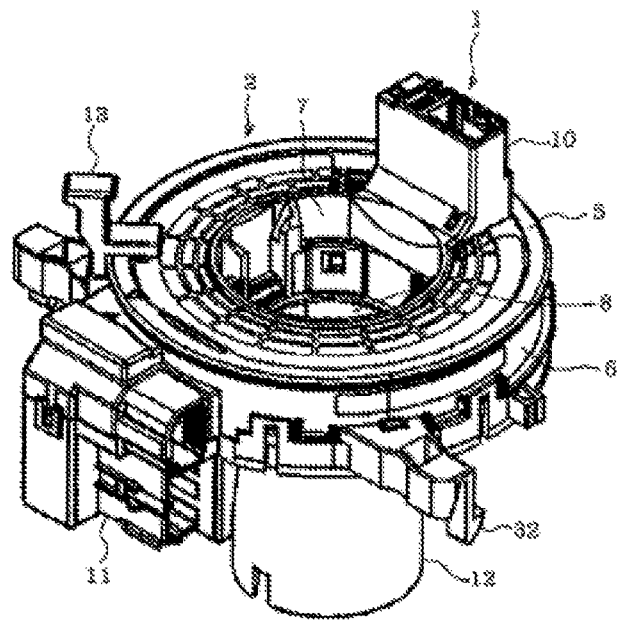
FIG. 4 is a perspective view of a steering roll connector.

FIG. 4 is a perspective view of the steering roll connector 2. The steering roll connector 2 includes a rotor 5 which lies on the steering side and a stator 6 which lies on the steering column side. Through holes 7, 8 are formed in the rotor 5 and the stator 6, respectively. A steering shaft 9 (refer to FIG. 1) is passed through the through holes 7, 8 and a steering wheel (not shown) is fastened to a threaded portion 9a of the steering shaft 9 by a nut. In this case, with the steering wheel fastened o to the steering shaft 9 by the nut, a boss portion of the steering wheel is fitted in an inner circumferential surface of the steering roll connector 2, so that a rotation of the steering wheel is designed to be transmitted to the steering roll connector 2.

A connector 10 is provided on an upper surface of the rotor 5, and a connector 11 is provided on an outer circumference of the stator 6. These connectors 10, 11 are connected together by a flat cable (not shown) which is accommodated in an annular space portion defined between the rotor 5 and the stator 6. A connector which is connected to an electronic unit such as an air bag unit which is provided on the steering wheel side is connected to the connector 10 on the rotor 5 side. A connector of an ECU (Electronic Control Unit), not shown, is connected to the connector 11 on the stator 6 side. By adopting this configuration, the electronic unit on the steering wheel side and the ECU are connected irrespective of the operating or steering angle of the steering wheel.

A cylindrical sleeve 12, which is made from a resin, is mounted on an inner circumferential surface portion of the through hole 7 in the rotor 5. This sleeve 12 is designed to transmit a rotation of the steering wheel to the lever combination switch 3 and the steering angle sensor 4. A neutral position fixing pin 13 is attached to the stator 6. This neutral position fixing pin 13 is designed to fix temporarily the rotor 5 in its rotating neutral position with respect to the stator 6. The neutral position fixing pin 13 is removed after the steering wheel is mounted on the steering shaft 9.

Figure 5:
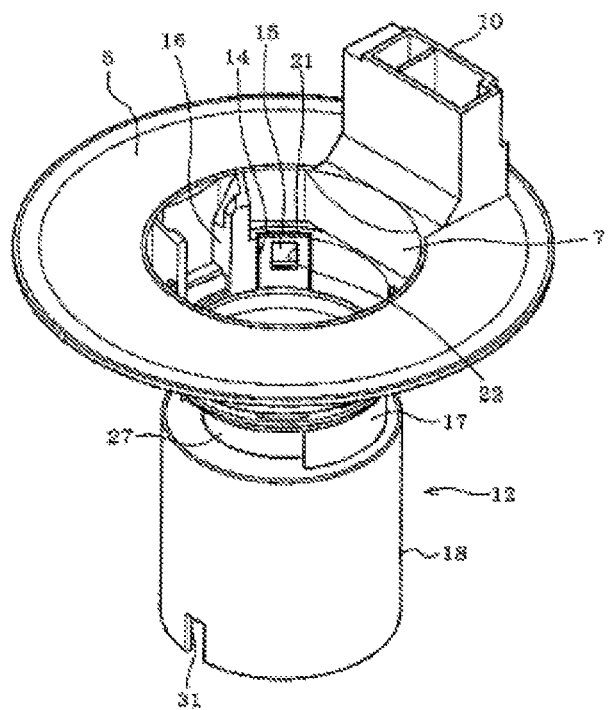
FIG. 5 is a perspective view illustrating a connecting construction of a rotor and a sleeve.

FIG. 5 is a perspective view illustrating a connecting construction of the rotor 5 and the sleeve 12, with the stator 6 omitted. The rotor 5 has an annular flange. A plurality of groove portions 14 are formed on the inner circumferential surface portion of the through hole 7 which is formed in the center of the rotor 5 so as to extend along an axial direction. In addition, an engagement claw 15 having an inclined surface portion is formed in each groove portion 14 so as to extend along the axial direction. In addition, a mounting portion 16 is formed on the inner circumferential surface portion of the through hole 7 in which the boss portion of the steering wheel is fitted.

Figure 6:
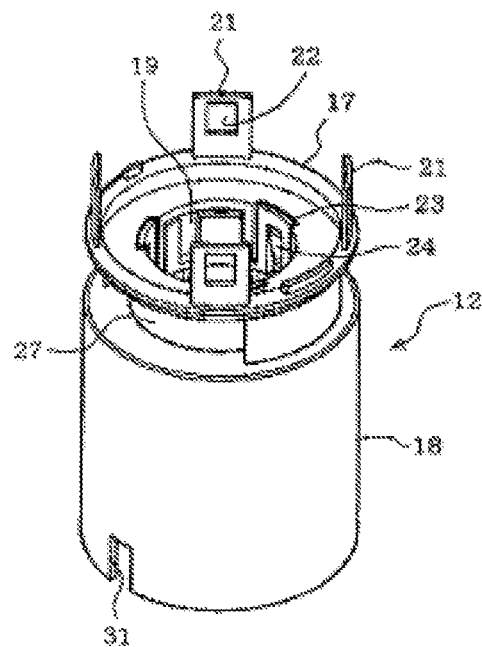
FIG. 6 is a perspective view of the sleeve.
Figure 7:
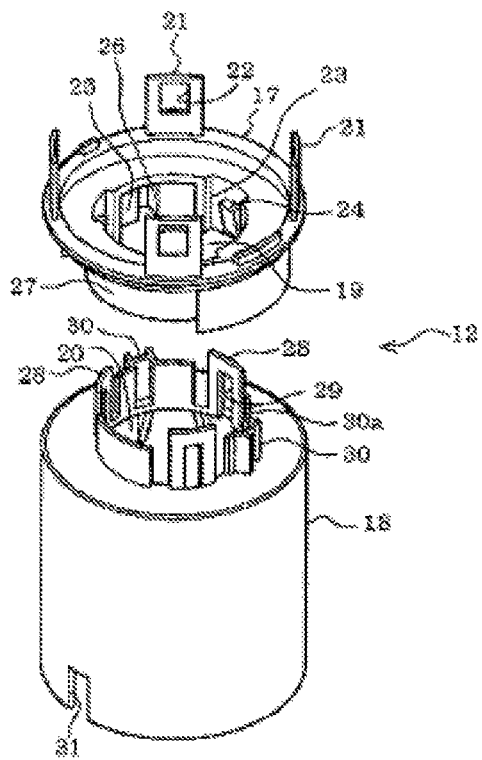
FIG. 7 is an exploded perspective view of the sleeve.

Next, the sleeve 12 will be described. FIG. 6 is a perspective view of the sleeve 12, and FIG. 7 is an exploded perspective view of the sleeve 12. The sleeve 12 has a first sleeve 17 and a second sleeve 18 which are connected to each other. Through holes 19, 29 are formed in those sleeves, and the steering shaft 9 is passed through the through holes 19, 20. A plurality of engagement pieces 21 are provided on an upper circumferential edge portion of the through hole 19 in the first sleeve 17 so as to be erected therefrom, and an engagement hole 22 is formed in each engagement piece 21. The engagement holes 22 of the engagement pieces 21 are designed to be brought into engagement with the engagement claws 15 of the rotor 5, whereby the sleeve 12 is mounted on the rotor 5 (refer to FIG. 5).

A plurality of groove portions 23 are formed on an inner circumferential surface portion of the through hole 19 in the first sleeve 17 so as to extend along the axial direction. An engagement claw 24 (a joint portion), which is formed into an inclined surface, is formed in each groove portion 23. Groove portions 25 are formed between the groove portions 23 formed on the inner circumferential surface portion of the through hole 19 in the first sleeve 17 so as to extend along the axial direction. Further, elongated fitting groove portions 26 are formed on specific groove portions 25 so as to project in a circumferential direction. In addition, a cancellation cam portion 27 is formed on an outer circumferential surface portion of the first sleeve 17.

A plurality of engagement pieces 28 (the joint portion) are provided on an upper circumferential edge portion of the through hole 20 in the second sleeve 18 so as to be erected therefrom. An engagement hole 29 is formed in each engagement piece 28. The first sleeve 17 and the second sleeve 18 are connected together by the engagement holes 29 of the engagement pieces 28 being brought into engagement with the engagement claws of the first sleeve 17. Elongated fitting projecting portions 30 which are each supported by ribs 30 are provided to be erected between the engagement pieces 28. The engagement pieces 28 are formed on the upper circumferential edge portion of the through hole 20 in the second sleeve 18 so as to be erected therefrom. The elongated fitting projecting portions 30 fit in the elongated fitting groove portions 26 of the first sleeve 17. By adopting this configuration, a rotating force is transmitted from the first sleeve 17 to the second sleeve 18 in an ensured fashion. In addition, a cutout portion 31 is formed in an end portion of the second sleeve 18.

Figure 8:
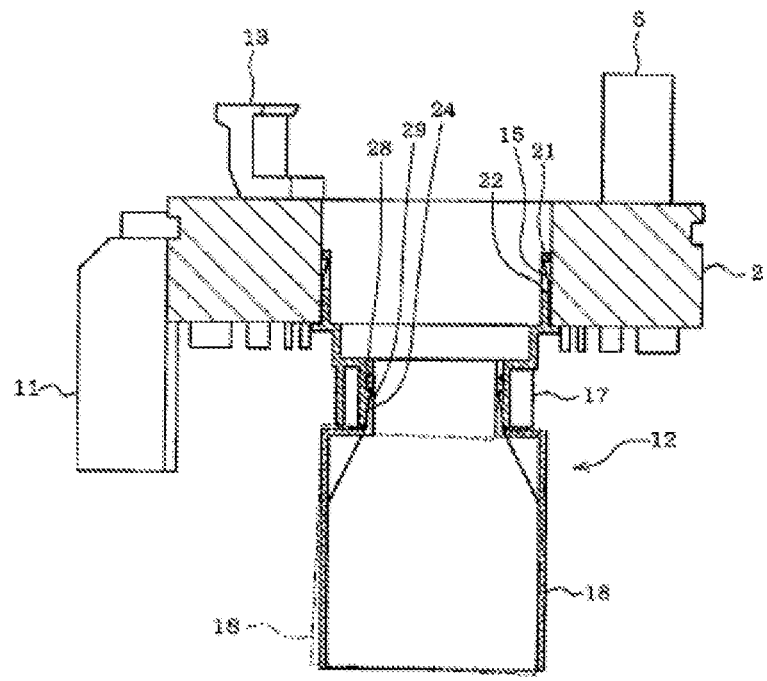
FIG. 8 is a sectional view showing the sleeve mounted on the steering roll connected.
Figure 9:
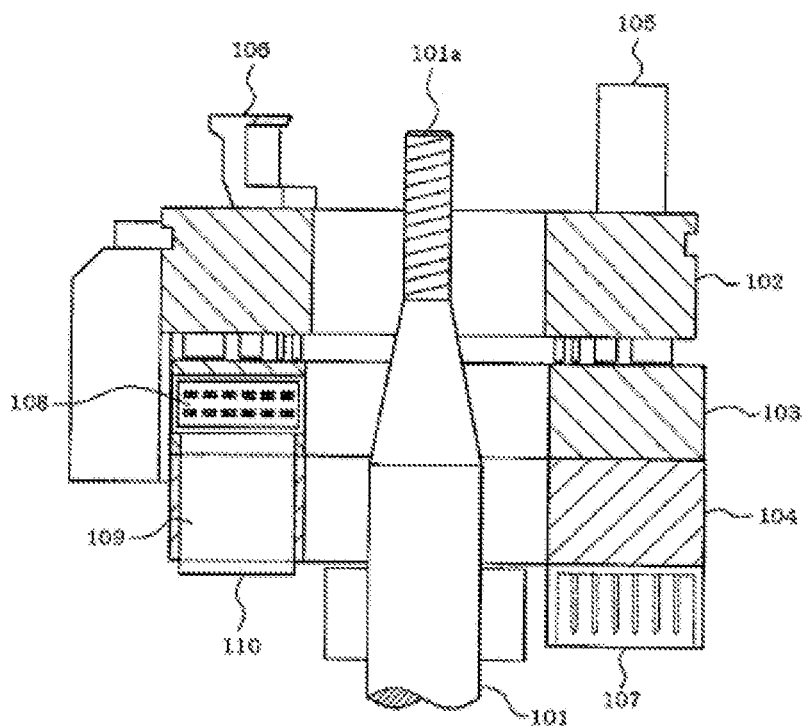
FIG. 9 is a sectional view showing a related lever combination switch unit.

Here, the engagement pieces 28 of the second sleeve 18 are designed to be brought into engagement with the groove portions 23 of the first sleeve 17 with no gap provided therebetween in a rotating direction of the steering shaft. On the other hand, the engagement pieces 28 are designed to be brought into engagement with the groove portions 23 with a predetermined gap (for example, 0.5 mm) provided therebetween in a circumferential direction perpendicular to the axial direction of the steering shaft. This configuration is intended not only to transmit the rotation of the steering wheel to the steering angle sensor 4 with good accuracy but also to deal with eccentricity between the steering roll connector 2 and the steering angle sensor 4 which are connected together by the sleeve 12. FIG. 8 is a sectional view showing the eccentricity of the sleeve 12 which is mounted on the steering roll connector 2. The second sleeve 18 is permitted to be inclined relative to the first sleeve 17 as indicated by chain double-dashed lines to thereby absorb the eccentricity of the steering roll connector 2 with the steering angle sensor 4.

As is shown in FIG. 4, a plurality of engagement claws 32 are formed on an outer circumferential portion of the steering roll connector 2. The steering roll connector 2 and the lever combination switch 3 are integrated with each other by the engagement claws 32 being brought into engagement with engagement portions 33 (refer to FIG. 2) which are formed on the lever combination switch 3.

Since the configuration of the lever combination switch 3 is known, the detailed description thereof will be omitted here, and the lever combination switch 3 will be described briefly. A turn-indicator lever 35 and a wiper lever 36 are provided on a body 34 of the lever combination switch 3, and to cope with the two levers so mounted, two connectors 37, 38 are provided on a lower surface of the body 34 so as to be directed downwards. An operation signal indicating an operation of the turn-indicator lever 35 is output from the connector 37, while an operation signal indicating an operation of the wiper lever 36 is output from the connector 38. In this case, a ratchet, not shown, which is provided on the turn-indicator lever 35 side is brought into elastic abutment with the cancellation cam portion 27 of the first sleeve 17. The ratchet and the cancellation cam portion 27 cooperate with each other to return the turn-indicator lever 35 to its neutral position in response to the steering wheel returning to its neutral position.

The steering angle sensor 4 is screwed to the lower side of the lever combination switch 3. The cutout portion 31 formed in the end portion of the second sleeve 18 is brought into engagement with a projecting portion 40 which projects inwards in a through hole 39 in the steering angle sensor 4. By this configuration, the rotation of the steering roll connector 2 is transmitted from the steering roll connector 2 to the steering angle sensor 4 through the sleeve 12. A connector 41 is provided on the steering angle sensor 4 so as to be directed sideways, and a signal indicating a rotating position of the steering wheel is output from the connector 41.

In assembling the lever combination switch unit 1 on to a vehicle, firstly, the lever combination switch 3 through which the steering shaft 9 is passed is fixed to a steering column, not shown. Then, the steering wheel is fastened to the threaded portion 9a of the steering shaft 9 by the nut. Next, the connector on the steering wheel side is attached to the connector 10 of the steering roll connector 2, and connectors from the ECU which corresponds to the connectors 37, 38 of the lever combination switch 3 and the steering angle sensor 4 are connected. In this case, as is seen from FIG. 1 which shows schematically the section of the lever combination switch unit 1, the connectors 37, 38 of the lever combination switch 3 and the connector 41 of the steering angle sensor 4 are arranged near to each other. Thus, wiring work to these connectors 37, 38 can be facilitated.

According to the embodiment that has been described heretofore, by the steering angle sensor 4 being connected to the lower side of the lever combination switch 3 where the connectors 37, 38 are disposed, the connectors 37, 38 of the lever combination switch 3 and the connector 41 of the steering angle sensor 4 are allowed to be arranged near to each other. Thus, the wiring work to those connectors 37, 38 can be facilitated. In this case, the rotation of the steering roll connector 2 is transmitted to the steering angle sensor 4 by the resin sleeve 12. Thus, the facilitation of the wiring work can be implemented without using the extension device which is made up mainly of the relatively expensive wiring circuit board as done in the conventional vehicle switch unit, thereby making it possible to realize a reduction in costs of the lever combination switch unit 1.

Moreover, in the sleeve 12, the first sleeve 17 and the second sleeve 18 are connected so that there is provided no gap therebetween in the rotating direction of the steering wheel while a slight gap being provided therebetween in the circumferential direction which is at right angles to the axial direction of the steering wheel. Thus, even in the event that the axes of the steering roll connector 2 and the steering angle sensor 4 are eccentric with each other, the rotation of the steering wheel can be transmitted to the steering angle sensor 4 via the sleeve 12 in an ensured fashion with the eccentricity being absorbed.

In addition, the sleeve 12 is built up by connecting the first sleeve 17 and the second sleeve 18 together through engagement, and further, the sleeve 12 is attached to the steering wheel through engagement. Thus, the sleeve 12 can be built up and the sleeve 12 so built up can then be attached to the steering roll connector 2 without using any special device.

The invention is not limited to the embodiment that has been described above but can be modified or improved as follows.

The connector 41 of the steering angle sensor 4 may be directed in the same direction in which the connectors 37, 38 of the lever combination switch 3 are directed.

The sleeve 12 may be formed integrally instead of being made up of the separate constituent components or may be divided into three or more constituent components.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2009-218985 filed on Sep. 24, 2009, the contents of which are incorporated herein by reference.

What is claimed is:

1. A vehicle switch unit comprising:
   a steering roll connector adapted to be mounted on a steering wheel for outputting a signal from the steering wheel to an exterior portion;
   a lever combination switch which is provided to a lower side of the steering roll connector for outputting a signal indicating an operation performed on a lever through a connector that is provided on a lower side of the lever combination switch;
   a steering angle sensor which is provided to a lower side of the lever combination switch and has a connector for outputting a signal indicating a rotating angle of the steering wheel; and
   a resin sleeve which is mounted on the steering roll connector for transmitting a rotation of the steering roll connector to the steering angle sensor,
   wherein the sleeve includes a first sleeve and a second sleeve which are connected to each other by a joint portion; and
   wherein the joint portion is configured to connect the first sleeve to the second sleeve so that there is no gap between the first sleeve and the second sleeve in a rotating direction of the steering wheel and there is a gap between the first sleeve and the second sleeve in a direction perpendicular to an axial direction of the steering wheel.

2. The vehicle switch unit according to claim 1, wherein the sleeve has engagement portions to engage with the steering roll connector and the steering angle sensor.

3. The vehicle switch unit according to claim 1, wherein the connector of the lever combination switch and the connector of the steering angle sensor are arranged at a same plane perpendicular to an axial direction of the steering wheel.

* * * * *